United States Patent [19]

Riedesel, Jr. et al.

[11] 4,427,941
[45] Jan. 24, 1984

[54] TEMPERATURE COMPENSATED WELL LOGGING TOOL

[75] Inventors: Roland G. Riedesel, Jr., Spring; Theodore W. Nussbaum; Wayne F. Warren, both of Houston, all of Tex.

[73] Assignee: Texaco Inc., White Plains, N.Y.

[21] Appl. No.: 292,368

[22] Filed: Aug. 13, 1981

[51] Int. Cl.³ .................. G01V 3/28; G01V 3/30; E21B 47/06
[52] U.S. Cl. ............................. 324/323; 324/338
[58] Field of Search ............ 324/225, 329, 338–343, 324/346, 323; 73/152, 154

[56] References Cited

U.S. PATENT DOCUMENTS

| | | | |
|---|---|---|---|
| 2,640,869 | 6/1953 | Zimmerman | 324/346 X |
| 2,895,108 | 7/1959 | Haddad et al. | 324/225 X |
| 3,402,348 | 9/1968 | Hoehn et al. | 324/346 |
| 3,581,194 | 5/1971 | Tegholm | 324/330 X |
| 3,818,323 | 6/1974 | Dowling et al. | 324/339 |
| 4,107,598 | 8/1978 | Meador et al. | 324/341 |

*Primary Examiner*—Gerard R. Strecker
*Attorney, Agent, or Firm*—Carl G. Ries; Robert A. Kulason; Ronald G. Gillespie

[57] ABSTRACT

A well logging tool adapted for use in a borehole traversing an earth formation includes at least one sensor sensing at least one characteristic of the earth formation. Another sensor senses the ambient temperature and provides a corresponding temperature signal. An output circuit provides a temperature compensated output signal corresponding to the sensed characteristic of the earth formation in accordance with the temperature signal and the characteristic signal.

9 Claims, 2 Drawing Figures

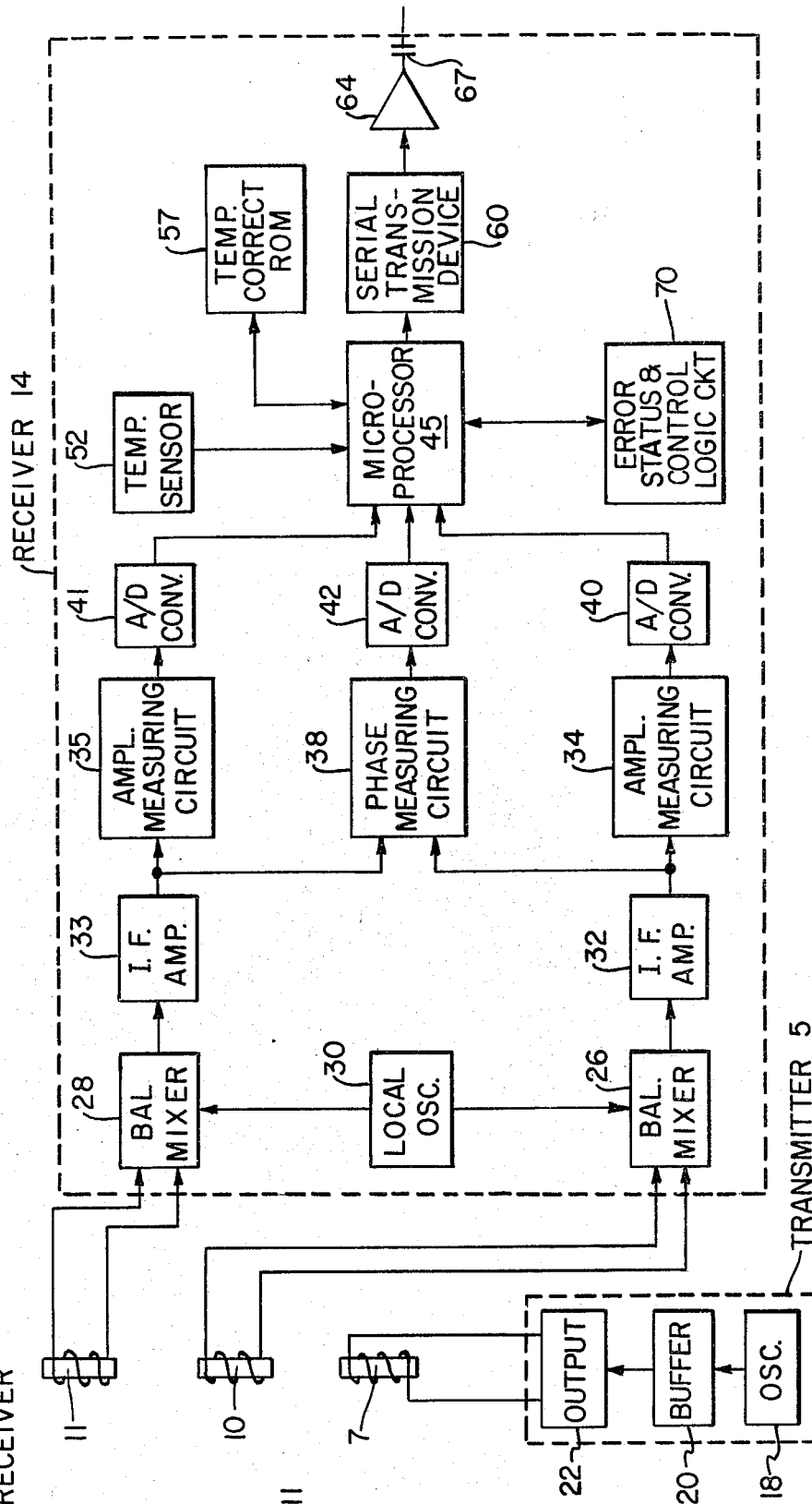
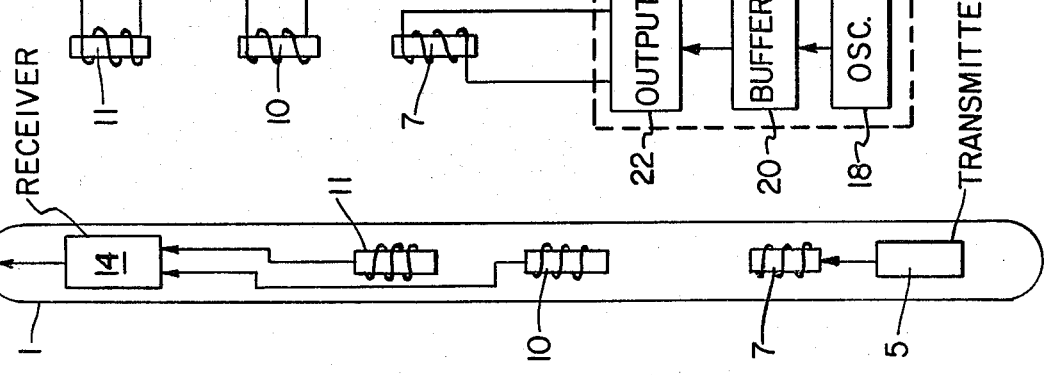

TEMPERATURE COMPENSATED WELL LOGGING TOOL

BACKGROUND OF THE INVENTION

Field of the Invention

The present invention relates to well logging in general and, more particularly, to well logging instruments having compensated signals.

SUMMARY OF THE INVENTION

A well logging tool, adapted for use in a borehole traversing an earth formation, includes a sensor sensing at least one characteristic of the earth formation. Another sensor senses the temperature and provides a corresponding temperature signal. An output circuit provides a temperature compensated output signal corresponding to the sensed characteristic of the earth formation in accordance with the signals from the characteristic sensor and from the temperature sensor.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 1 is a simplified block diagram of a well logging tool.

FIG. 2 is a detailed block diagram of the transmitter and of the receiver, constructed in accordance with the present invention, shown in FIG. 1.

DESCRIPTION OF THE INVENTION

Referring to FIG. 1, a logging sonde 1 contains a transmitter 5 which provides an alternating current signal at a predetermined frequency, preferably that of 2 megahertz, to a transmitter coil 7. In operation, transmitter coil 7 transmits electrical energy into an earth formation (not shown). Receiver coils 10 and 11 are preferably spaced 25 and 37 inches, respectively, from transmitter coil 7. Receiver coils 10 and 11 receive electrical energy that has passed through the earth's formation and provides corresponding alternating current signals to a receiver 14.

Referring now to FIG. 2, transmitter 5 includes an oscillator 18 providing a signal to a buffer amplifier 20 which in turn provides the signal to a power output amplifier shown as output 22. A typical power output would be in the order of 2 watts. The two megahertz signal emitted by coil 7 causes an electromagnetic field to propagate through the surrounding formation and this field is detected sequentially by receiver coils 10 and 11. The time lag or phase angle between the two signals detected at coils 10 and 11 is inversely proportional to the resistivity of the surrounding formation.

Coils 10, 11 provide signals to balanced mixers 26 and 28, respectively, which also receives a signal from a local oscillator 30 having a predetermined frequency of about 1.998 megahertz. Balanced mixers 26, 28 provide IF signals at a predetermined frequency, preferably about 2 kilohertz, to IF amplifiers 32 and 33, respectively, which, in turn provide IF signals to amplitude measuring circuits 34 and 35, respectively. Amplitude measuring circuits 35, 34 provide signals corresponding to the amplitudes of the signals from IF amplifiers 32 and 33, respectively. The signals from IF amplifiers 32, 33 are also applied to a phase measuring circuit 38 which provides a signal corresponding to the phase difference between the signals from IF amplifiers 32, 33.

The foregoing represents a dielectric well logging tool which is known in the prior art. The present invention represents an improvement not only to that well logging tool but to other well logging tools utilizing sensors downhole by correcting the sensed data for temperature effects downhole prior to transmission uphole.

Analog-to-digital converters 40, 41 and 42 convert the analog signals from amplitude and phase measuring circuits 34, 35 and 38, respectively, to provide parallel digital signals to a microprocessor 45. A temperature sensor 52 senses the downhole temperature and provides parallel digital signals to microprocessor 45. Microprocessor 45 controls a temperature correction read only memory 57 to select predetermined temperature correction values in accordance with the temperature signals from temperature sensor 52. Microprocessor 45 corrects the signals from converters 40, 41 and 42 in accordance with the selected temperature correction values to provide temperature corrected parallel digital signals representative of the signals from amplitude and phase measuring circuits 34, 35 and 38. Microprocessor 45 provides the parallel digital signals to a serial transmission device 60, of the type manufactured by Intersil Inc. as their part number IM6402. Transmission device 60 provides a serial digital signal in accordance with the parallel digital signals from microprocessor 45 to a buffer amplifier 64 which provides an output signal through a capacitor 67 for transmission uphole for processing at the surface.

A conventional type error status and control logic circuit 70 receives signals from and provides signals to microprocessor 45 and serial transmission device 60. Circuit 70 provides error detection in the digital signals processing.

It should be noted that this temperature correction method is also applicable to other types of sensing being performed by a well logging tool.

The present invention as hereinbefore described is a well logging tool for use in a borehole containing sensors sensing parameters and characteristics of an earth formation and providing temperature corrected signals corresponding to the characteristics of the earth formation.

What is claimed is:

1. A well logging tool adapted for use in a borehole traversing an earth formation comprising:
    characteristic sensing means sensing at least one characteristic of the earth formation and providing corresponding characteristic signals;
    temperature sensing means for sensing the ambient temperature and providing a corresponding temperature signal; and
    output signal means connected to the characteristic sensing means and to the temperature sensing means for providing a temperature compensated output signal corresponding to the sensed characteristic in accordance with the characteristic signals and the temperature signal;
    said output signal means includes:

memory means having stored within it temperature compensated values for characterization signals, and data correction means for controlling the memory means in accordance with the temperature signal and the characterization signals to select the proper temperature compensated values and for providing the output signal in accordance with the selected temperature compensated values.

2. A well logging tool as described in claim 1 in which the data correction means includes means for converting the selected values to a serial signal which is provided as the output signal.

3. A well logging tool as described in claim 1 in which the characteristic sensing means includes
transmitter means for providing an energizing voltage,
a transmitter coil means responsive to the energizing voltage for inducing electromagnetic energy into the earth formation,
first and second receiver coil means spaced a predetermined distance apart for receiving the electromagnetic energy from the earth formation and providing corresponding signals, and
receiver means connected to both receiver coil means and to the microprocessor means for providing the characterization signals to the microprocessor means in accordance with the signals from both receiver coil means.

4. A well logging tool as described in claim 3 in which the transmitter means includes
oscillator means providing a signal at a predetermined frequency,
buffer amplifying means connected to the oscillator means for providing the signal from the oscillator means without loading down the oscillator means, and
energizing means connected to the buffer means and to the transmitter coil means for energizing the transmitter coil means in accordance with the signal from the buffer means.

5. A well logging tool as described in claim 4 in which the receiver means includes
local oscillator means for providing a signal at a second predetermined frequency,
two mixer means, one mixer means being connected to one receiver coil means and to the local oscillator means and the other mixer means being connected to the other receiver coil means and to the other local oscillator means, for mixing the signal from the local oscillator means with the signals being provided by both receiver coil means,
two IF amplifier means, each IF amplifier means being connected to a corresponding mixer means for amplifying signals provided by the mixer means,
two amplitude measuring means, each amplitude measuring means being connected to a corresponding IF amplifier means and to the data correction means for providing a signal to the data correction means, corresponding to the amplitude of the signal from the IF amplifier means, and
phase measuring means connected to both IF amplifier means and to the data correction means for providing a signal to the data correction means corresponding to the phase difference between the signals from the IF amplifier means.

6. A well logging tool as described in claim 5 in which all signals provided to the data correction means are parallel digital signals and the data correction means provides the output signal as a serial digital signal.

7. A well logging tool as described in claim 6 in which the data correction means includes
microprocessor means connected to both amplitude measuring means, to the phase measuring means, to the temperature sensing means and to the memory means for controlling the memory means in accordance with the parallel digital signals from both amplitude measuring means, the phase measuring means and the temperature sensing means and for providing parallel digital signals corresponding to the selected temperature compensated values, and
transmission means connected to the microprocessor means for providing the serial digital output signal in accordance with the parallel digital signals provided by the microprocessor.

8. A well logging tool as described in claim 7 further comprising error status and control circuit means connected to the microprocessor means and to the converter means for detecting errors in the digital processing.

9. A well logging method comprising the steps of
inserting a well logging tool into a borehole traversing an earth formation,
sensing from within the well logging tool at least one characteristic of the earth formation,
providing a plurality of characteristic signals in accordance with the sensed characteristic,
sensing the temperature in the well logging tool,
providing a temperature signal in accordance with the sensed temperature,
storing temperature compensated values for characterization signals in the well logging tool,
selecting the temperature compensated values in accordance with the characteristic signals and temperature signals, and
providing a temperature compensated output signal corresponding to the sensed characteristic in accordance with the selected value.

* * * * *